United States Patent [19]
Reed

[11] Patent Number: 5,742,111
[45] Date of Patent: Apr. 21, 1998

[54] D.C. ELECTRIC MOTOR

[75] Inventor: Troy Gene Reed, Tulsa, Okla.

[73] Assignee: Surge Power Corporation, Tulsa, Okla.

[21] Appl. No.: 588,342

[22] Filed: Jan. 18, 1996

[51] Int. Cl.[6] .................................................. H02K 13/00
[52] U.S. Cl. .......................... 310/236; 310/233; 310/227
[58] Field of Search .................................. 310/233, 236, 310/227, 228

[56] References Cited

U.S. PATENT DOCUMENTS

| | | | |
|---|---|---|---|
| 1,713,089 | 5/1929 | Phillips | 310/227 |
| 2,915,658 | 12/1959 | Arnold | 310/236 |
| 4,406,962 | 9/1983 | Fridman | 310/233 |
| 4,774,426 | 9/1988 | Mohr et al. | 310/154 |
| 4,930,210 | 6/1990 | Wang | 29/597 |
| 5,001,375 | 3/1991 | Jones | 310/68 |

FOREIGN PATENT DOCUMENTS

| | | | |
|---|---|---|---|
| 1026844 | 3/1958 | Germany | 310/227 |
| 405421 | 9/1943 | Italy | 310/236 |
| 16971 | of 1906 | United Kingdom | 310/236 |

OTHER PUBLICATIONS

"The Slotting of Commutators of Electric Motors," Scientific American, Col. 1, Vth Article. Oct. 23, 1915.

*Primary Examiner*—Thomas M. Dougherty
*Assistant Examiner*—B. Mullin
*Attorney, Agent, or Firm*—Head, Johnson & Kachigian

[57] ABSTRACT

The commutator segments for a d.c. electric motor includes one or plurality of slots which improves horsepower at less amperage.

4 Claims, 5 Drawing Sheets

1

D.C. ELECTRIC MOTOR

FIELD OF THE INVENTION

This invention is directed to an improved direct current (d.c.) motor. In particular, it is directed to an improved commutator system for a d.c. motor.

BACKGROUND OF THE INVENTION

A typical d.c. motor comprises a cylindrical stator, a rotor journaled on a shaft for rotation within the stator with a uniform gap between the rotor and stator as the rotor rotates. Armature windings are inserted in slots in a cylindrical surface on one of the stator and rotor and being divided into similar coils mutually spaced around the shaft axis. Magnetic field generating means are located on the other of said stator and rotor for forming poles mutually spaced around the shaft axis. D.C. motors require commutation, i.e., the process of reversing the current in each armature coil. This is carried out when the commutator segments to which the coil is connected are short-circuited by a brush connected to the d.c. supply voltage. The commutator is made up of a plurality of insulated, separate segments formed in a cylindrical surface with each surface electrically connected to an armature coil. The stator may comprise a ring of permanent or d.c.-field magnets which are attached to the inside of a housing or frame surrounding the rotor.

Structurally, a typical commutator consists of a plurality of wedge-shaped copper bars that are built up to form a complete circular cylindrical contact surface with each segment separated and electrically insulated from one another by thin strips of mica. Means are provided to permit attachment of the ends of each rotor coil winding to separate spaced commutator bars. Stationary brushes of carbon blocks or copper gauze, which are electrically connected to a d.c. source, ride upon the commutator contact surface which make contact with the commutator segments. The d.c. current which is supplied to the brushes flows in the appropriate direction to the rotor coils only when they are opposite the appropriate field pole (North or South). The appropriate direction means that for all coils, the force produced will be in the same direction at all speeds and loads for the ring of segments and the brushes provide automatic switching to insure that this is so. A d.c. commutator motor has advantages over induction and synchronous motors in the ability to provide efficient speed variation over a wide range without a variable supply frequency. D.C. motors are typically classified as "shunt", "series", "compound" (sometimes classed as a varying speed motor), or "compensated compound" motors depending upon the application. Motors used in golf carts are inclusive of this invention. D.C. motors are particularly favored where high speed or variable speed electric drive is required.

SUMMARY OF THE INVENTION

It is an object of this invention to provide an improved commutator for a d.c. electric motor which will provide improved horse power and torque for a given volt/amperage input as compared to a conventional d.c. motor.

In accordance with this invention, there is provided a d.c. motor comprising a cylindrical stator that includes permanent or d.c. fed coil type magnets. A rotor is journalled on a shaft for rotation within the stator with a uniform gap between the rotor and the stator as the rotor rotates. There are insulated armature windings, or coils, which are inserted in slots in a cylindrical surface on the rotor being divided into similar coils mutually spaced around the shaft axis. Magnetic field generating means are located on the other of the stator and the rotor for forming magnetic poles mutually spaced around the shaft axis. A switching means occurs utilizing commutator segments which are adapted to connect the armature coils to a d.c. source in timed synchronism with a rotation of the rotor. The d.c. electric source flows through brushes which may be carbon blocks or copper gauze. The switching means connects the armature coils to the d.c. source and in timed synchronism with the rotation of the rotor such that switching of the d.c. to each armature coil occurs when a magnetic pole generated by that coil is substantially in alignment with a rotor (or stator) pole of opposite polarity and thereby drawing it toward each other to create the rotary motion. In other aspects like polarity is created to exert a repelling force on the rotor poles to maintain the rotation. Instead of the field generating means, the stator may comprise a permanent magnet which can include the motor casing that supports the stator.

A primary object of this invention is to provide a d.c. motor with an improved commutator, wherein the brush contact surface of each commutators segment includes at least one gap or slot that is angular to, or transverse to, the direction of rotation of the commutator.

These and other objects of the invention will become more apparent upon further reading of the specification, claims and drawings herewith.

DETAILED DESCRIPTION OF THE PREFERRED EMBODIMENT

While the invention has been described with a certain degree of particularity, it is manifest that many changes may be made in the details of construction and the arrangement of components without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled.

Figure 1:
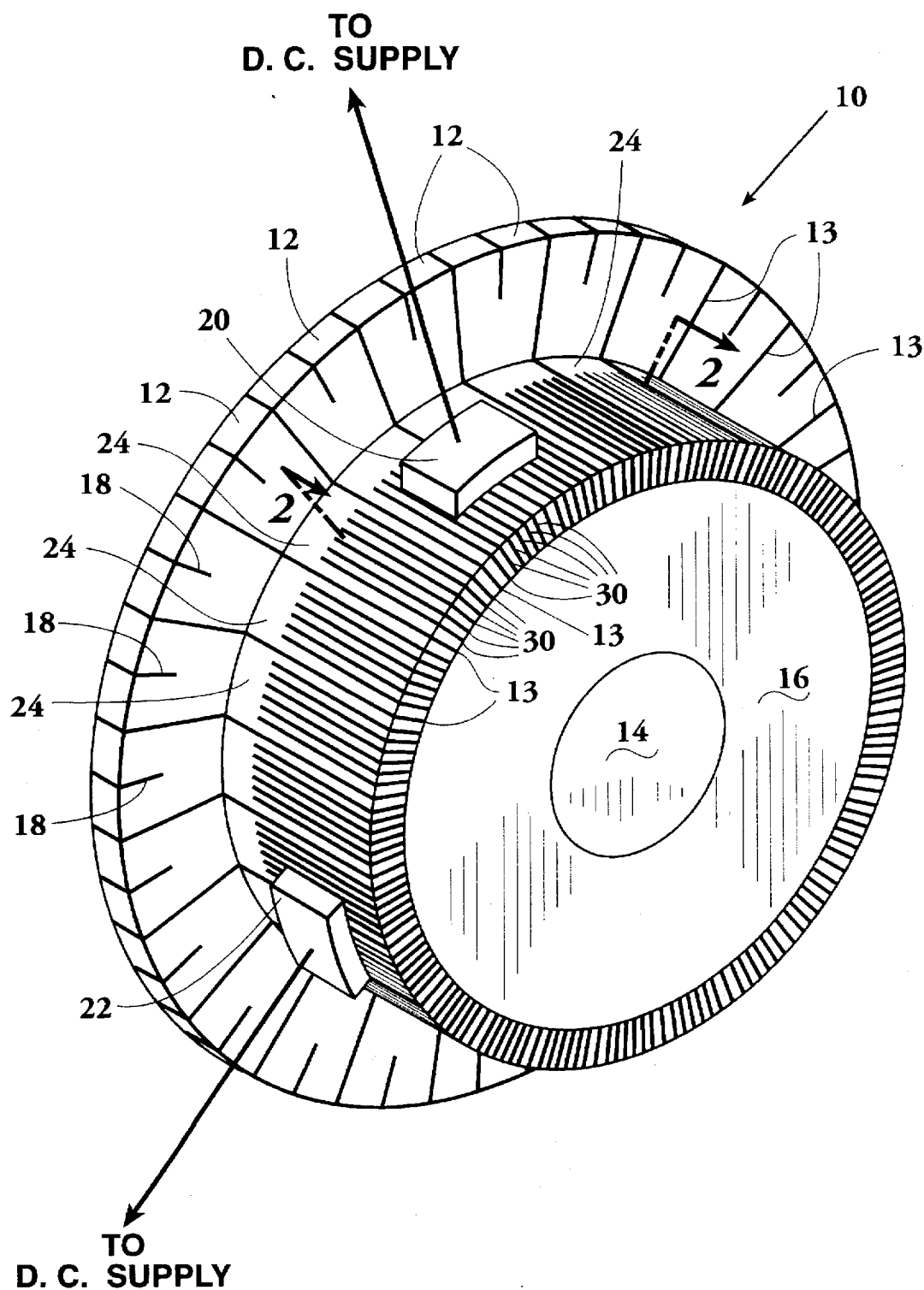
FIG. 1 is a perspective view of the commutator formed as a part of this invention.
Figure 3:
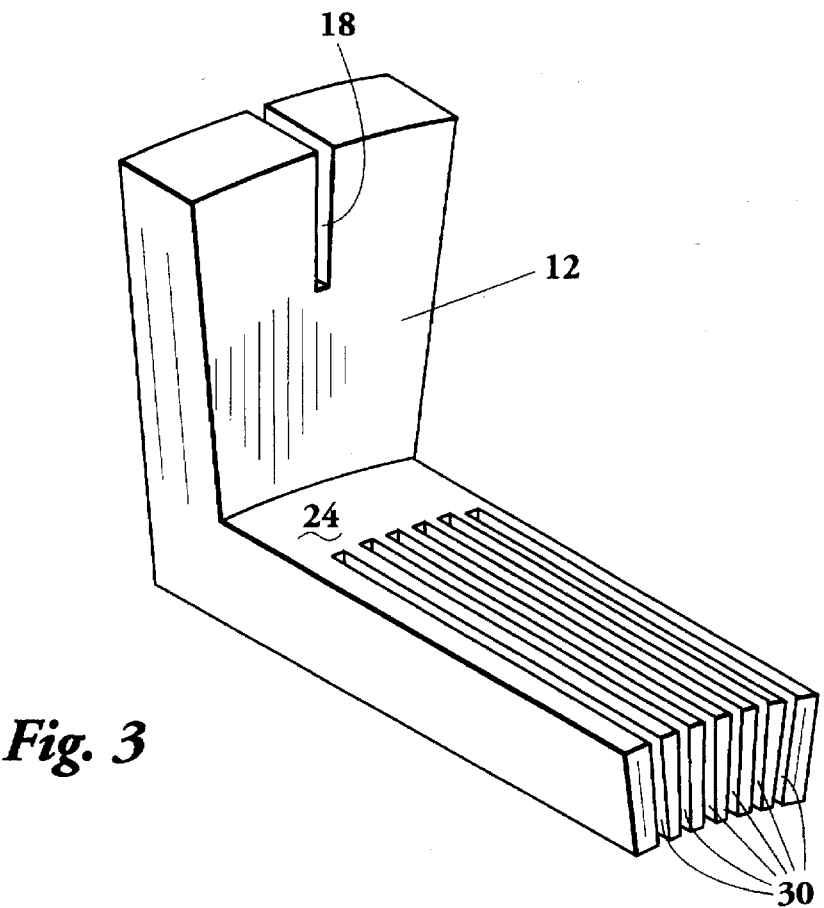
FIG. 3 is a perspective view of an individual commutator segment forming this invention.
Figure 2:
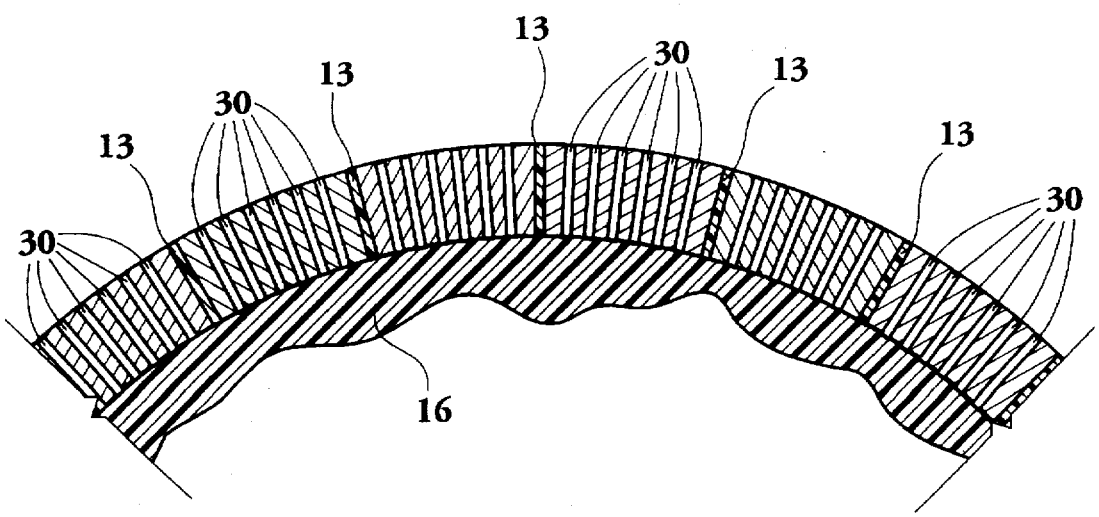
FIG. 2 is a partial sectional view across the commutator of this invention.

Referring now to FIG. 1, 2, and 3, the commutator of this invention is generally designated by the numeral 10 and is comprised of a plurality of individual insulated segments 12,. The commutator is attached to the rotor shaft 14 and includes a hub 16 to which the segments 12 are insulatively attached. Each segment includes a means such as a slot or other form of electrical wiring connection 18 which connects with the appropriate portions of the armature coils which are formed within the rotor. A plurality of brushes 20 and 22 are used to make rubbing electrical contact with contact surface 24 of each segment. The brushes are appropriately connected to a d.c. source, i.e., a battery or the like, as is well known to those skilled in the art. The number and size of segments 12 and number of brushes 20 and 22 may vary and depend upon the performance characteristics of each d.c. motor design. Each commutator segment 12 is insulatively separated at 13 usually with mica.

Figure 7:
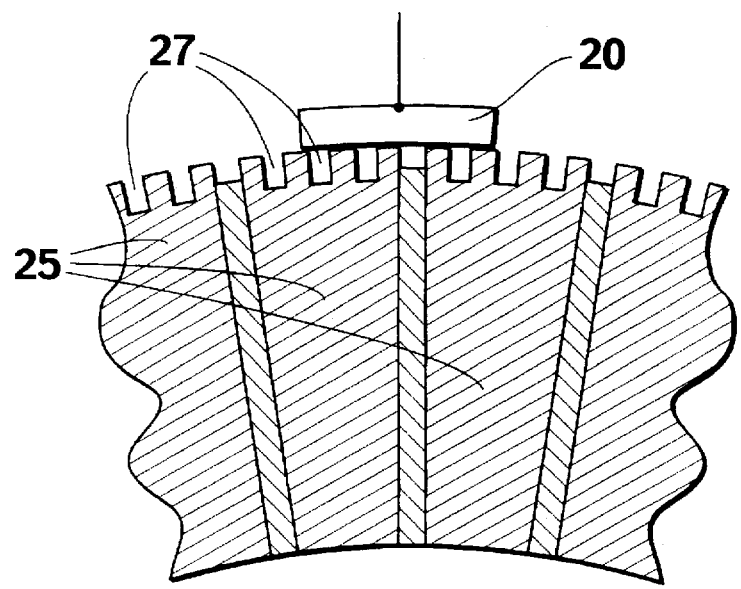
FIG. 7 is a partial sectional view across a commutators segment of another embodiment of this invention.
Figure 8:
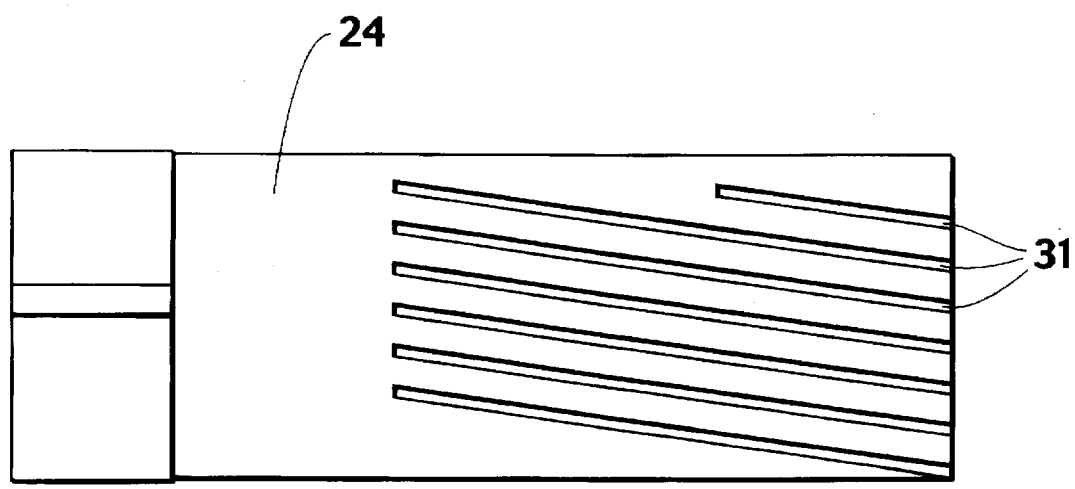
FIG. 8 is a top elevational view of an alternate form of an individual commutator segment of this invention.

The invention herein comprises at least one or a plurality of air gaps or slots 30, as best shown in FIGS. 2 and 3, in the brush contact surface 24 of each segment 12. The air gaps or slots are cut into the cylindrical contact surface 24 preferably radially and transverse to the direction of rotation of the commutator. The gaps are typically slots of width ranging in width between 0.010" (0.25 mm) and 0.032" (0.81 mm). This range is not limiting, as the size of the slots will vary as to the width of the contact surface of the commutator and the number of slots therein. The slots could be angularly directed relative to the direction of rotation of the commutator, as shown in FIG. 8. As shown in FIG. 7 each segment 25 includes slots 27 of partial depth or, as shown in FIGS. 2 and 3, the full depth of the contact surface of the commutator segment and may be open or filled with an inert material, e.g., mica or other electrically insulative material.

Figure 4:
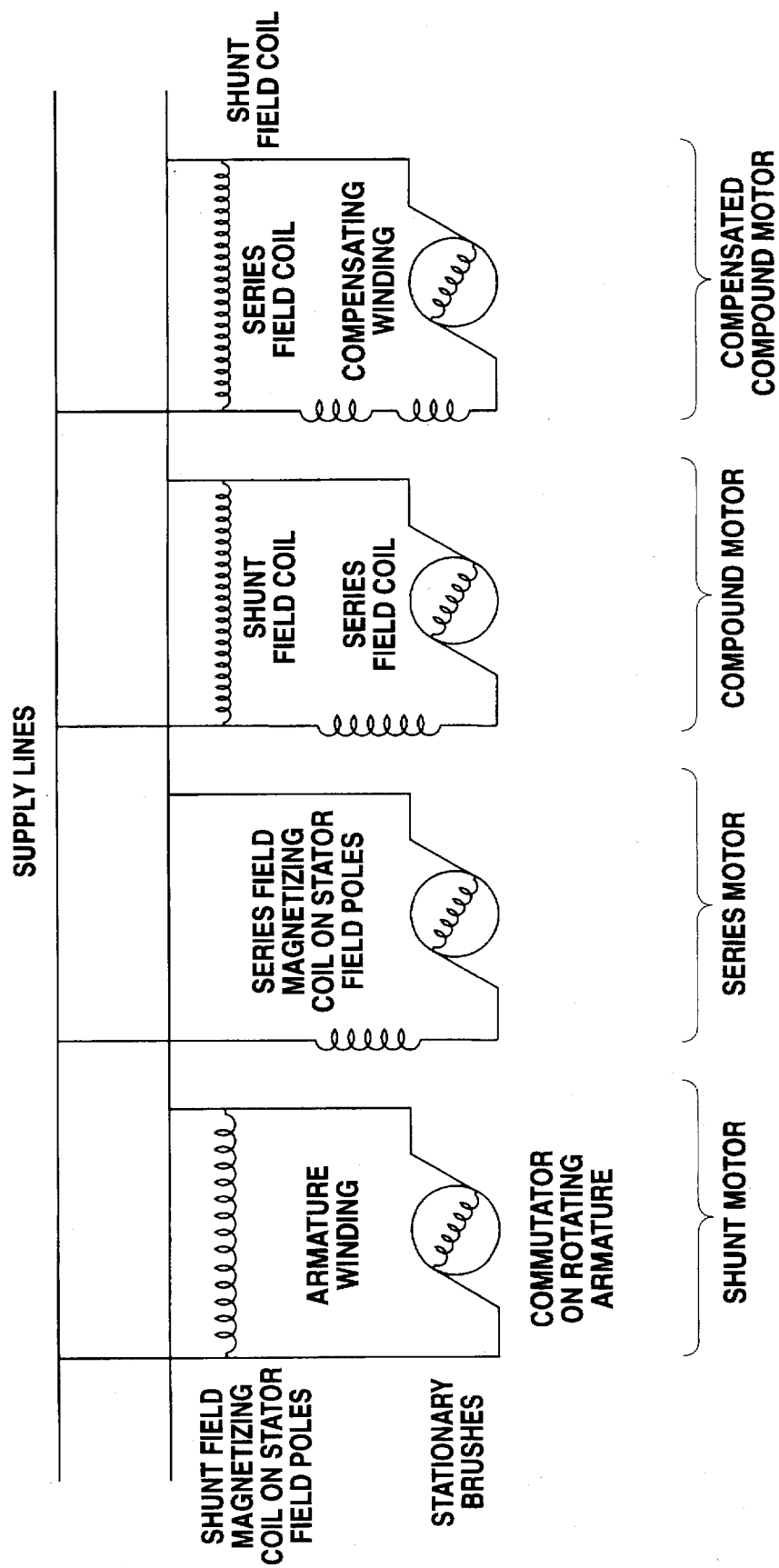
FIG. 4 is a simple schematic of a variety of forms of d.c. electric motors.

FIG. 4 is submitted to show schematically the various exemplary forms of d.c. motors to which this invention is applicable.

Although the slots are shown as radial and transverse to the direction of rotation of the rotor and rotor shaft, the invention includes slots which are angularly directed to the direction of rotation.

FIG. 4 represents wiring schematics of various forms of d.c. motors to which this invention is applicable, although not limited thereto.

Figure 5:
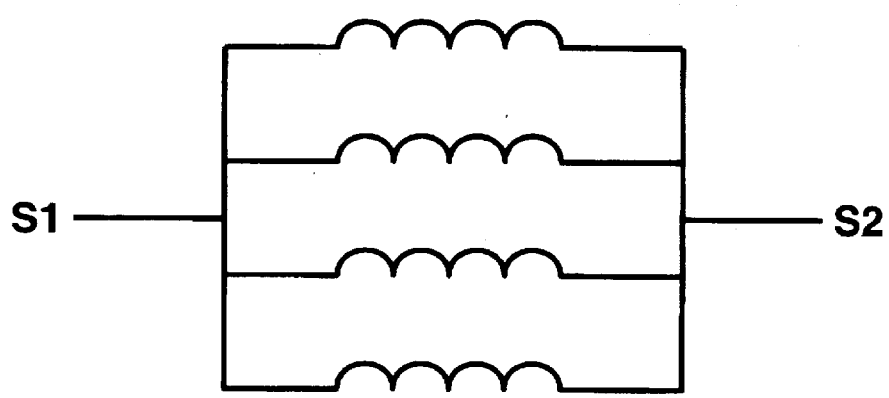
FIG. 5 and 6 are wiring diagrams of the test motor described herein.
Figure 6:
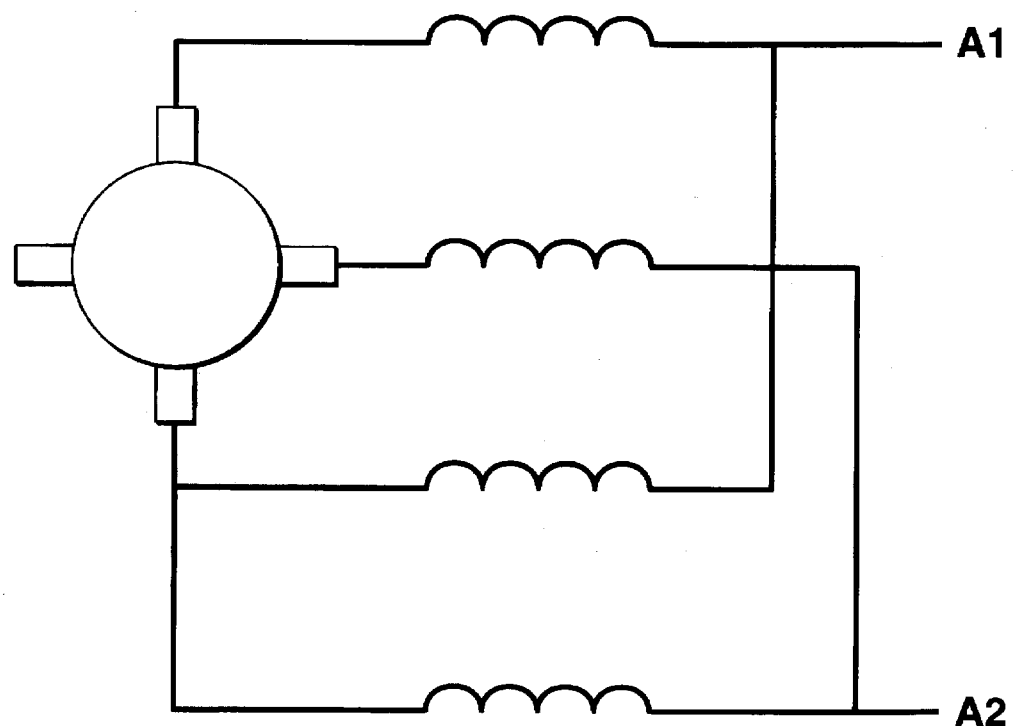

FIGS. 5 and 6 represent the stator(s) and armature wiring schematics for the test motor described heretofore.

FIG. 8 depicts commutator segment 24 with angular slots 31.

PERFORMANCE CHARACTERISTICS

A test was conducted comparing a standard series wound 8 horsepower at 3400 rpm, d.c. motor, type 7544D, sold under the name VERSATILE as manufactured by the Baldor Electric Company of St. Louis, Mo. with the same motor having a commutator modified in accordance with this invention. The motor used d.c. enhanced magnet wire coils, four(4) in the stator and two (2) in the armature. The standard motor commutator had 72 segments with effectively 4 brushes. The test results were as follows:

| | STANDARD MOTOR | | | | | |
|---|---|---|---|---|---|---|
| RPM | TORQUE LB-FT | TORQUE N/m | AMPS | VOLTS | HORSE-POWER | a % Eff. |
| 3004[1] | | | 14.20 | 80 | | |
| 4770 | 3.00 | 4.07 | 24.80 | 160 | 2.726 | 51 |
| 4172 | 6.00 | 8.13 | 32.40 | 160 | 4.769 | 69 |
| 3797 | 9.25 | 12.54 | 40.90 | 160 | 6.690 | 76 |
| 3604[2] | 12.25 | 16.61 | 48.90 | 160 | 8.409 | 80 |
| 3400 | 15.50 | 21.02 | 57.10 | 160 | 10.127 | 83 |
| 3313 | 10.50 | 14.24 | 65.40 | 160 | 11.674 | 83 |
| 3652 | 11.501 | 15.59 | 46.90 | 160 | 8.000 | 80 |
| 3598 | 12.353 | 16.75 | 49.16 | 160 | 8.466 | 80 |

[1]No load.
[2]Full load.
Note:
Newton-meter (N/m) calculated: 1.355818 × lb-ft-force.

Efficiency calculated:

$$n\% = \frac{746 \cdot P}{E \cdot I}$$

Where:

P=Horsepower

E=Volts

I=Amps

In the modified commutator, according to this invention, the contact surface of each segment was modified to include one air gap or slot 0.023" (0.58 mm) in width therein. The modified commutators included two tests, one where the armature windings were soldered to the commutator segment and another where they were brazed. Tests on the soldered were made where the motor was run both clockwise and counterclockwise. The comparative results were as follows:

| | SOLDER (CLOCKWISE) | | | | | |
|---|---|---|---|---|---|---|
| RPM | TORQUE in-lb | TORQUE N/m | AMPS | VOLTS | HORSE-POWER | n % |
| 1697 | 158 | 17.85 | 50.7 | 80 | 4.26 | 78 |
| 1895 | 173 | 19.54 | 53.4 | 90 | 5.20 | 80 |
| 2055 | 188 | 21.23 | 57.2 | 100 | 5.13 | 67 |
| 2256 | 203 | 22.93 | 60.6 | 110 | 7.27 | 81 |
| 2445 | 215 | 24.28 | 63.7 | 120 | 9.34 | 91 |
| 2631 | 236 | 26.66 | 68.2 | 132 | 9.86 | 81 |
| 2791 | 248 | 28.01 | 70.5 | 140 | 10.99 | 83 |
| 2970 | 257 | 29.03 | 73.0 | 149 | 12.12 | 83 |

Note:
Newton-meter (N/m) calculated: 1.129848 × in-lb-Force × 10⁻¹.

| | SOLDER (COUNTERCLOCKWISE) | | | | | |
|---|---|---|---|---|---|---|
| RPM | TORQUE in-lb | TORQUE N/m | AMPS | VOLTS | HORSE-POWER | n % |
| 1703 | 158 | 17.85 | 47.5 | 80 | 4.27 | 83 |
| 1957 | 173 | 19.54 | 50.6 | 90 | 5.37 | 87 |
| 2344 | 188 | 21.23 | 54.2 | 100 | 6.99 | 96 |
| 2314 | 203 | 22.93 | 58.0 | 110 | 7.46 | 87 |
| 2513 | 215 | 24.28 | 60.9 | 120 | 8.58 | 87 |
| 2717 | 236 | 26.66 | 65.4 | 132 | 10.18 | 87 |
| 2858 | 248 | 28.01 | 68.0 | 140 | 11.25 | 88 |
| 3229 | 257 | 29.03 | 70.0 | 149 | 13.17 | 94 |

| | BRAZED (COUNTERCLOCKWISE) | | | | | |
|---|---|---|---|---|---|---|
| RPM | TORQUE in-lb | TORQUE N/m | AMPS | VOLTS | HORSE-POWER | n % |
| 1742 | 158 | 17.85 | 47.5 | 80 | 4.37 | 85 |
| 1920 | 173 | 19.54 | 50.6 | 90 | 5.27 | 86 |
| 2127 | 188 | 21.23 | 54.5 | 100 | 6.35 | 87 |
| 2308 | 203 | 22.93 | 57.7 | 110 | 7.44 | 87 |
| 2495 | 215 | 24.28 | 60.9 | 120 | 8.51 | 87 |
| 2690 | 236 | 26.66 | 65.4 | 132 | 10.08 | 87 |
| 2852 | 248 | 28.01 | 67.6 | 140 | 11.23 | 88 |
| 3012 | 257 | 29.03 | 70 | 149 | 12.29 | 89 |

Based on these tests, it would appear that a modified commutator, according to this invention, provides increased efficiency, greater torque and horsepower at lower rpm.

What is claimed is:

1. In a d.c. motor, energizable by a d.c. electrical source having, a cylindrical stator with field magnets;

a rotor;

armature coils;

a commutator connected to said rotor for switching a d.c. source to each armature coil in timed synchronism with the rotation of said rotor, said commutator having a cylindrical contact surface comprised of a plurality of insulatively separated segments, each segment electrically connected to an armature coil;

a plurality of fixed d.c. conductive brushes in conductive contact with said contact surface;

the improvement comprising a plurality of slots extending partially in a radial direction in said contact surface of each segment.

2. The d.c. motor of claim 1 wherein each said slot is of width in the range between 0.25 mm and 0.81 mm.

3. The d.c. motor of claim 1 wherein each said slot is transverse to the direction of rotation of said rotor.

4. The d.c. motor of claim 1 wherein each said slot is at an angle to the direction of rotation of said rotor.

* * * * *